Figure 1:
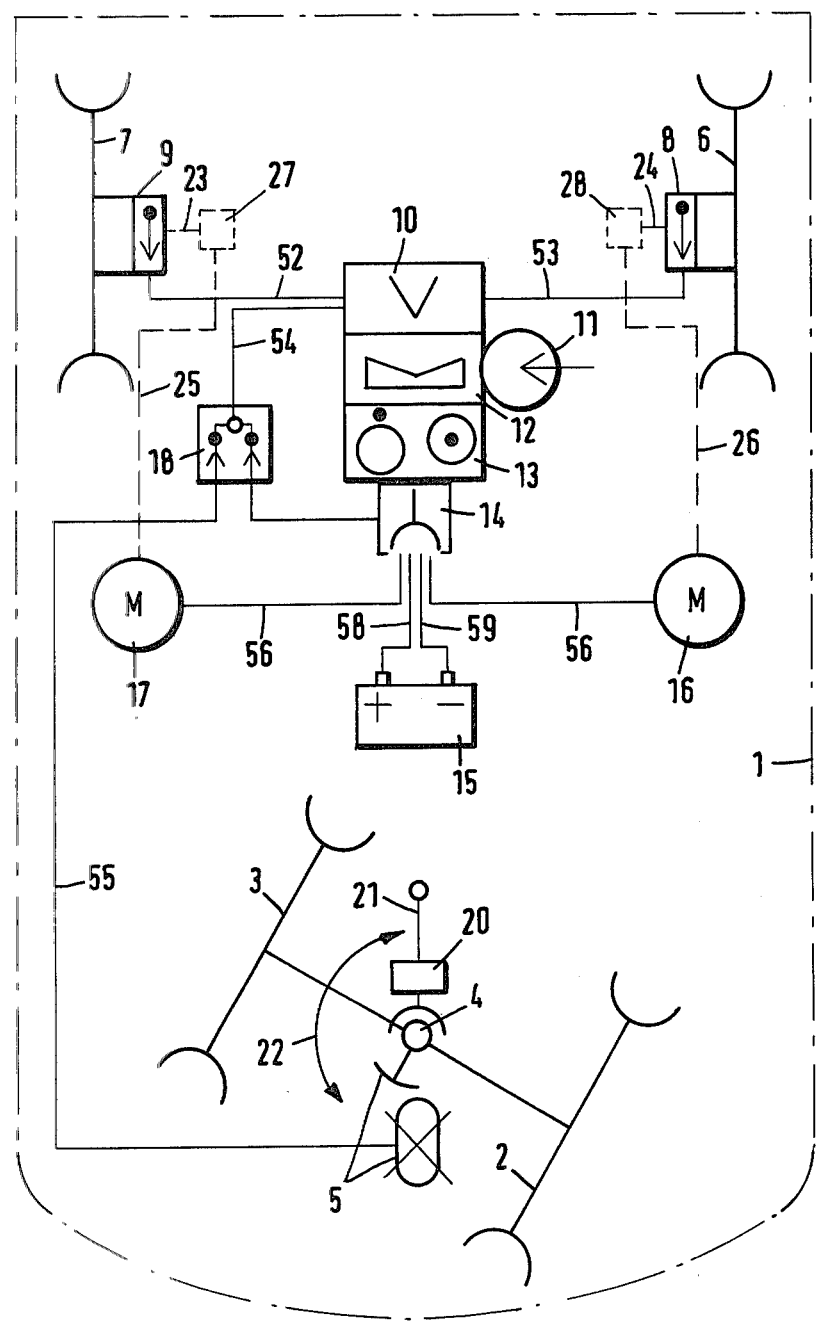

United States Patent [19]

Griesenbrock

[11] 4,354,568

[45] Oct. 19, 1982

[54] ELECTRICALLY CONTROLLED TRAVEL DRIVE CONTROL SYSTEM FOR STEERABLE VEHICLES, PARTICULARLY FORK LIFT TRUCKS

[75] Inventor: Karl-Heinz Griesenbrock, Stuvenborn, Fed. Rep. of Germany

[73] Assignee: Jungheinrich Unternehmensverwaltung KG, Hamburg, Fed. Rep. of Germany

[21] Appl. No.: 127,910

[22] Filed: Mar. 6, 1980

[30] Foreign Application Priority Data

Mar. 12, 1979 [DE] Fed. Rep. of Germany ....... 2909667

[51] Int. Cl.³ .............................................. B62D 11/04
[52] U.S. Cl. .................................. 180/197; 180/6.24; 180/76; 180/274; 180/290; 414/674
[58] Field of Search ...................... 180/190, 197, 6.24, 180/6.28, 282, 170, 175, 178, 285, 274.2 N; 303/105, 106, 100, 96; 361/238, 242; 364/426, 431; 414/674; 318/139; 187/9 R

[56] References Cited

U.S. PATENT DOCUMENTS

| | | | |
|---|---|---|---|
| 3,332,507 | 7/1967 | Bush | 180/6.28 |
| 3,719,246 | 3/1973 | Bott | 303/100 |
| 3,966,264 | 6/1976 | Mattori et al. | 180/76 X |
| 4,201,272 | 5/1980 | Midolo | 180/6.3 X |
| 4,206,829 | 6/1980 | Melocik | 180/290 |
| 4,221,530 | 9/1980 | Williams et al. | 180/290 |

FOREIGN PATENT DOCUMENTS

| | | |
|---|---|---|
| 908826 | 4/1954 | Fed. Rep. of Germany . |
| 2621374 | 11/1977 | Fed. Rep. of Germany . |
| 2832739 | 2/1980 | Fed. Rep. of Germany . |
| 2110103 | 5/1972 | France . |
| 2258973 | 8/1975 | France . |
| 1200895 | 8/1970 | United Kingdom . |
| 1403238 | 8/1975 | United Kingdom . |
| 1475508 | 6/1977 | United Kingdom . |
| 1339140 | 11/1977 | United Kingdom . |
| 1543823 | 4/1979 | United Kingdom . |

Primary Examiner—Joseph F. Peters, Jr.
Assistant Examiner—Randall A. Schrecengost
Attorney, Agent, or Firm—Toren, McGeady & Stanger

[57] ABSTRACT

The invention relates generally to steerable vehicles, particularly fork lift trucks, which include one or more travel drive motors adapted to be controlled in a predetermined manner, and a steerable swivelled wheel assembly. To increase the safety of such vehicle in operation, an electrically controlled drive control system is provided which is simple and free from elements that are susceptible to wear. For this purpose, two speed sensors are provided on opposite sides of the vehicle and cooperate with respective coaxial road wheels and are connected by a comparator to a switching system for controlling the travel drive, e.g., to a travel control signal generator. Elements for applying at least one additional speed-influencing input signal are associated with the comparator.

18 Claims, 4 Drawing Figures

ELECTRICALLY CONTROLLED TRAVEL DRIVE CONTROL SYSTEM FOR STEERABLE VEHICLES, PARTICULARLY FORK LIFT TRUCKS

This invention relates to an electrically controlled travel drive control system for steerable vehicles, particularly fork lift trucks, which comprises one or more travel drive motors adapted to be controlled in a predetermined manner, and a steerable road wheel assembly comprising at least one swivelled road wheel.

Such a vehicle, particularly a fork lift truck, may have two axles, i.e., four wheels, or more than two axles, or three wheels. In a so-called three-wheeled vehicle, the middle wheel assembly may comprise two wheels having a smaller spacing than the other mutually coaxial wheels. Particularly, in three-wheeled vehicles the so-called third wheel, which may be a twin wheel, is steerable and may also be driven, if desired. The invention is also applicable to vehicles of these known types in the various embodiments of the subject matter of the statement of claim.

The invention is based on the fact that arrangements of the kind described first hereinbefore are known. For instance, in a driving system comprising two travel drive motors one travel drive motor is de-energized by cam-actuated switches in response to an excursion of the steering gear beyond a predetermined angle (German Patent specification No. 908,826; U.S. Pat. No. 3,332,507). In that way, the operation of the travel drive motors can be adapted to the steering geometry of the vehicle only in coarse stages. Besides, cam-actuated switches are not reliable in operation, particularly when only a low d.c. voltage is available.

It is also known to use instead of the cam-actuated switches a potentiometer, which is directly or indirectly controlled by the steering gear, so that partial voltages can be tapped for a better coordination of the operation of the travel drive motors and the maximum speed of the vehicle can be decreased in dependence on the radius of curvature. But that arrangement too is not very reliable in operation because potentiometers are susceptible to wear in continuous operation.

It is an object of the invention to increase the safety in operation of vehicles which have one or more travel drive motors and have an axle-steering gear or a pivoted bogie-steering gear and to that end to provide an electrically controlled travel drive control system which is free from elements that are susceptible to contact wear or frictional wear and comprises simple means for controlling the drive means of the vehicle in a desired dependence on one or more functions of the travelling vehicle.

This object is accomplished according to the invention in that two speed sensors are provided on opposite sides of the vehicle and cooperate with respective coaxial road wheels and are connected by a comparator to a switching system for controlling the travel drive means, e.g., to a travel control signal generator, and means for applying at least one additional speed-influencing input signal are associated with the comparator. In this arrangement, as the vehicle is cornering, the motor control is advantageously influenced by the differential speed of the road wheels with which the speed sensors are associated so that any error which may be due to a spinning or slipping of the tires or on different rolling radii of the tires will be eliminated as well as tapping errors occurring in the control system due to wear.

The speed sensors are preferably associated with road wheels which are not steerable so that errors which may arise when sensors are associated with parts of the steering gear or steered elements will also be eliminated.

But the advantages stated above will be afforded even when the speed sensors are associated with steerable road wheels.

The speed sensors are preferably associated with driven road wheels. These road wheels may be provided with individual drive motors or may be driven by a travel drive motor via a differential.

The application of the invention to a vehicle having two travel drive motors for driving respective coaxial road wheels may be based on the concept that the different speeds of the motors necessarily resulting from the operation of such wheels during a steering of the vehicle are sensed at the final element, i.e., directly or indirectly at the driven wheels. In this way the influences exerted by the road surface on the wheels and resulting, for instance, in a spinning of a wheel, are also taken into account so that the motor control can be corrected in exact dependence on the instantaneous speeds of the driven wheels.

According to a preferred feature, these driven road wheels are not steerable because in that case the controlled variables to be sensed can be particularly exactly ascertained.

On the other hand, a direct cooperation between each sensor and a road wheel may be adopted although this gives rise to problems regarding space. An indirect cooperation may advantageously involve the use of scaling means. For instance, speed sensors may consist of incremental signal generators, which sense marks that rotate with the wheel. These marks may be arranged in different rows, which are adjacent to each other, so that the instantaneous speed can be sensed with high accuracy. This is of great advantage particularly in the operation of fork lift trucks.

It will be particularly desirable to provide the comparator with a memory, in which data that are specific to the vehicle are programmed. Such data specific to the vehicle may include, e.g., the track, the wheelbase, the height of the center of gravity of the empty vehicle, and the like. The invention thus provides a system in which such variables can be integrated in a single manner in a travel drive control system.

In a preferred embodiment of the invention, the means for applying the additional input signal comprises switching means for modifying the function which is controlled by the memory. In this way, additional variables related to the load, the height of the stack being carried in transit, eccentric loads and the like can be entered and taken into account.

In an embodiment which can be used in conjunction with a multiwheel drive, the travel drive means comprise at least two travel drive motors associated with respective coaxial road wheels and a proximity sensor or the like for detecting the angular steering excursion of a steerable wheel assembly and applies a control signal to the comparator. Such proximity sensor may consist in a suitable embodiment of a non-contacting inductive sensor, which operates continuously and by means of an electromagnetic field senses the angle and sense of the steering excursion. Such proximity sensors are commercially available and known. Their use in the stated system comprising two travel drive motors affords the advantage that these motors can be differentially controlled. In an advantageous embodiment, in response to a predetermined difference between the sensor signals, which difference depends on the angular steering excursion, the comparator delivers a signal which together with the signal from the memory causes such a shift of a threshold value that the maximum vehicle speeds determined by the switching means are limited to a value which is appropriate under the existing conditions. In this way the vehicle when cornering can be optimally driven also in dependence on changing conditions on the vehicle.

According to another desirable feature relating to a vehicle comprising two or more travel drive motors, at least one travel drive motor is controlled by an on-off switch, which is connected to the switching system and is responsive to predetermined limiting values of the comparator signal or to the function that is stored in the memory. Such a simple arrangement permits an adaptation to poor road conditions, upgrades, downgrades and the like so that the operation of the vehicle will be further optimized.

Regarding the design of the travel drive means, a preferred feature resides in that the proximity sensor or the like effects a partial erasing of the function stored in the memory of the comparator when the steering gear is moved through an intermediate angular range and a gate which is connected to the switching system detects a supply of current to the travel drive means. It will be understood that in such case the proximity sensor indicates the sense and/or the angle of the steering excursion of at least one steerable wheel. With this control feature, e.g., in a vehicle comprising a multiwheel drive, an undesirable decrease of the speed of driving elements will be prevented under foreseeable travel conditions, for instance, when the vehicle begins to travel after the steering gear has been adjusted during a standstill of the vehicle.

In such an arrangement, data which are specific to the vehicle are permanently programmed, particularly in the comparator. These are data which are significant in addition to the inputs to be sensed which are generated in operation. From this aspect, different wheelbases, different weights and different locations of the center of gravity of vehicles having different accessories, different tires and the like can be taken into account even when said vehicles are provided with control systems having identical travel control signal generators. When a vehicle provided with the above-mentioned multiwheel drive means has been stopped, the signals received last are stored for use when the vehicle is restarted. But when the steering gear has been adjusted during standstill, the signals stored last must not be used for restarting. In that case, the sensitive influence on the multiwheel drive in an intermediate portion of the steering range is eliminated in that the difference between the signals of the speed sensors is erased. In this way, an undesirable decrease of the speed of a drive motor can be avoided. When the travel has then been resumed, the signals from the speed sensors are again processed.

According to another advantageous feature of the invention, the means for modifying the preselected setting comprise input means associated with the comparator, with or without a memory, and means for applying at least one additional input signal, such as signals which represent the load moment and the lifting height when loads are being handled and transported. In this way the maximum speed may be kept below the safe limit which is applicable at the time so that the safety of travel will be improved and the electromotive braking can be automatically adapted to changing conditions of the vehicle. This concept may be applied to vehicles with various wheel arrangements.

Figure 2:
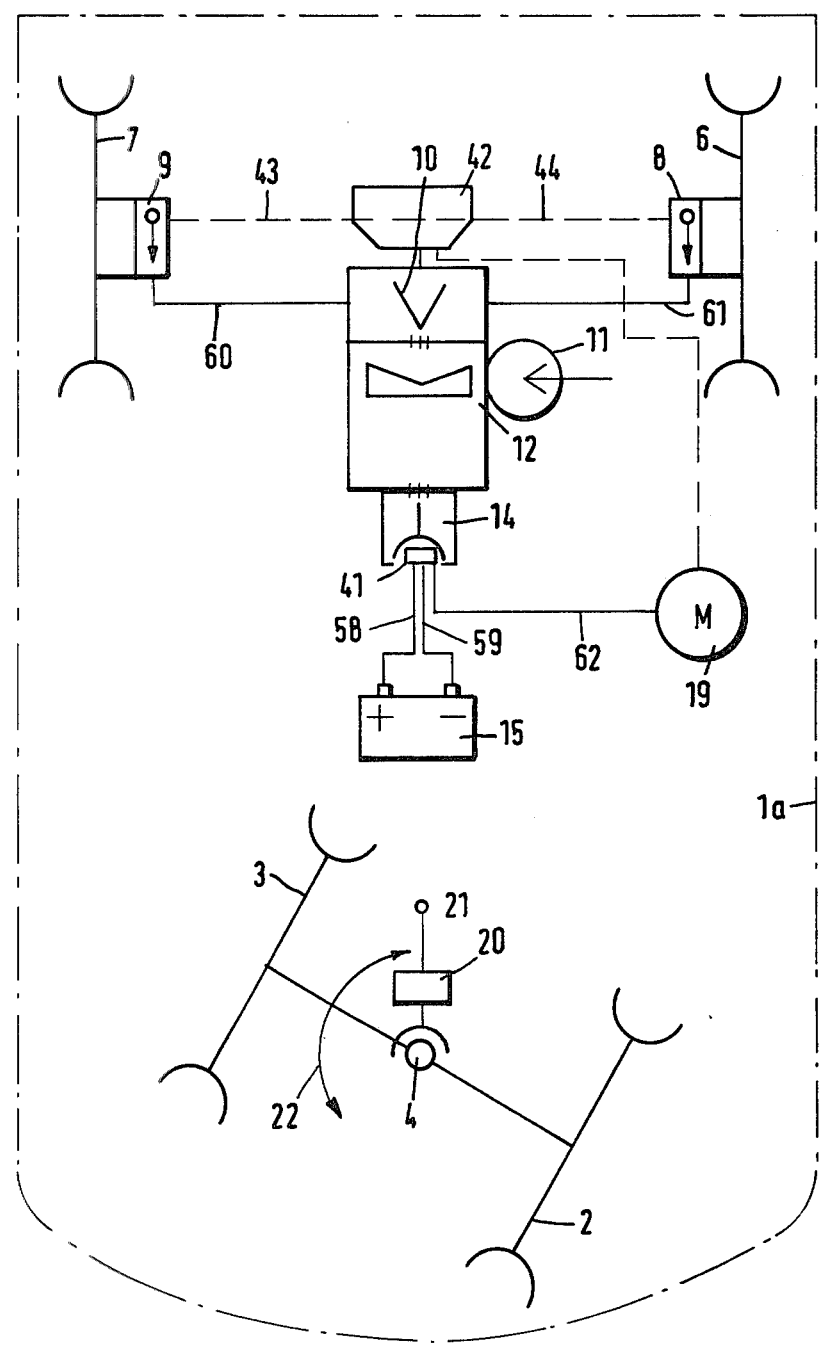
Figure 3:
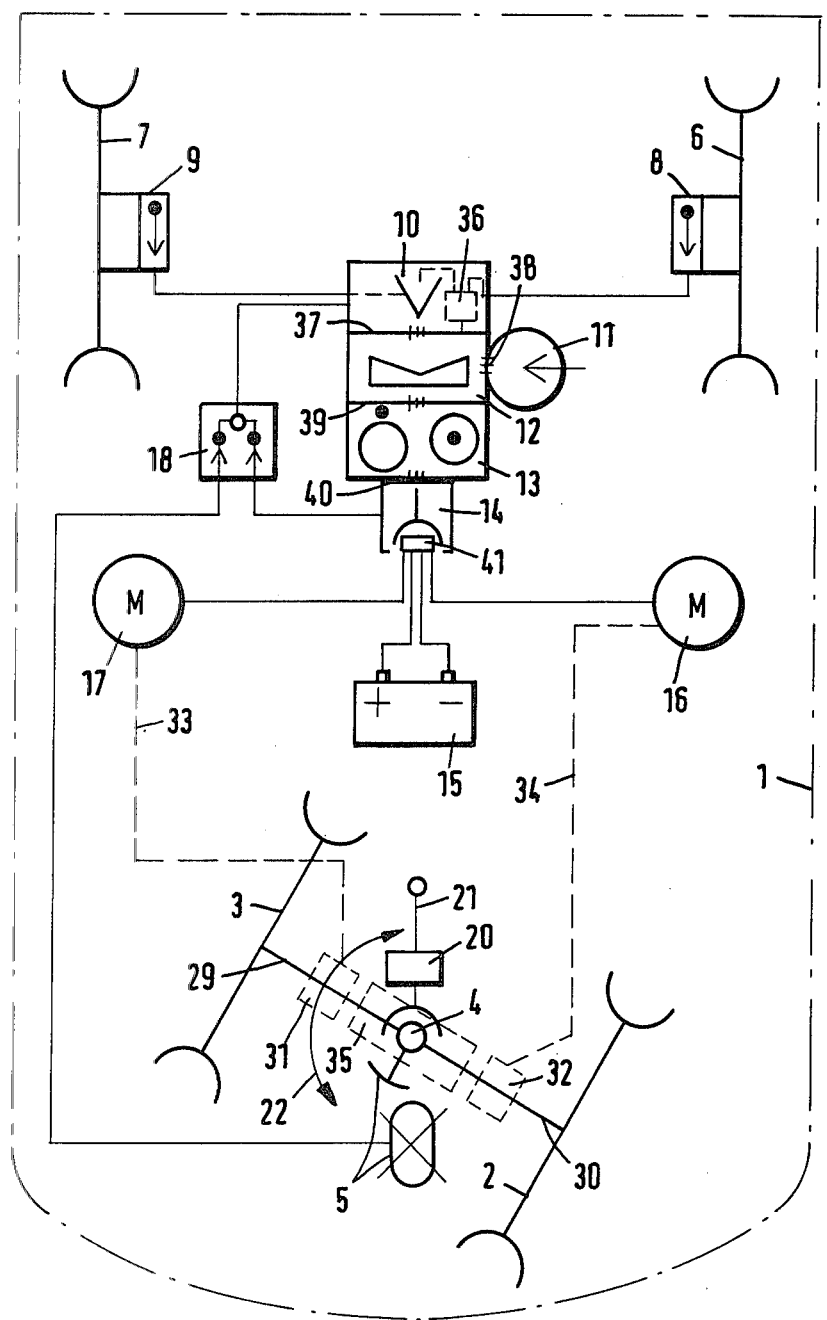
Figure 4:
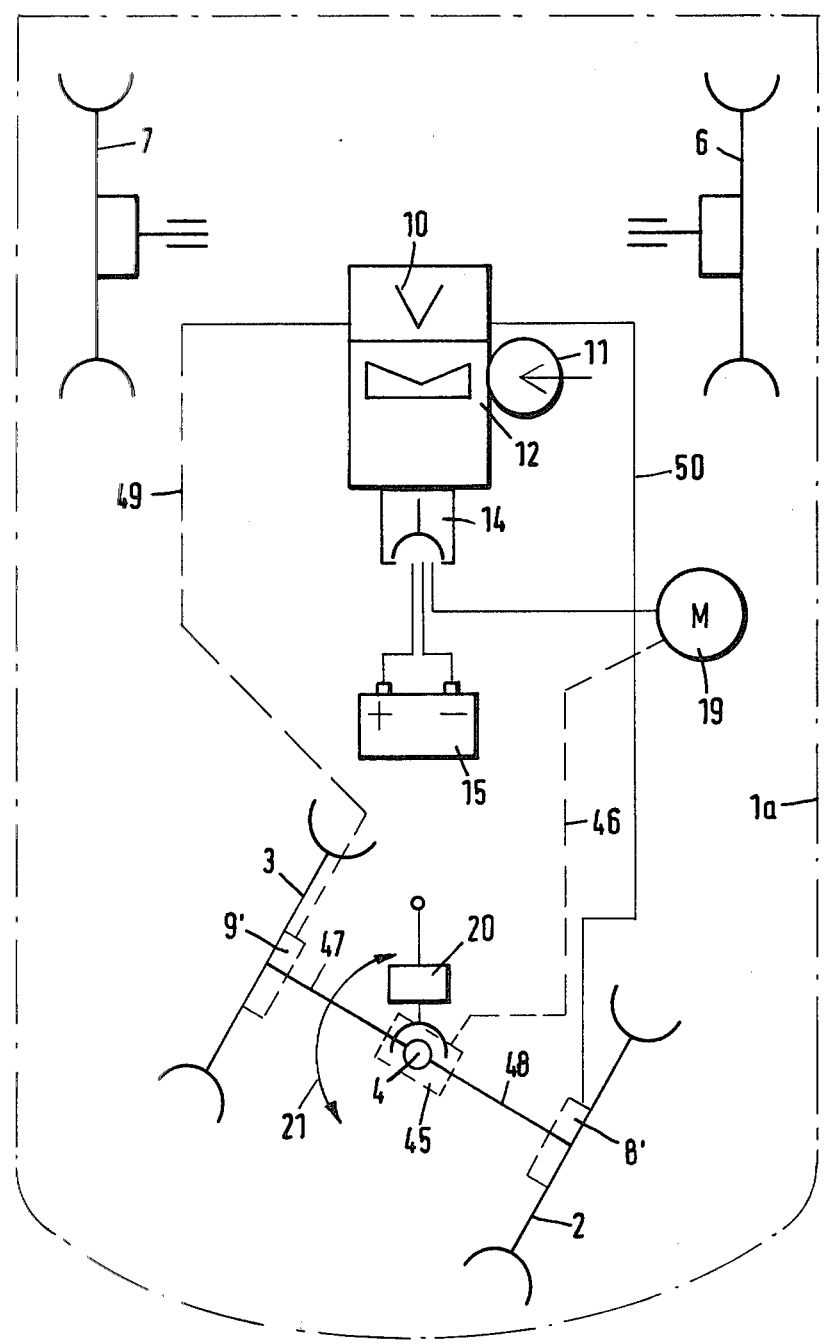

The invention will now be explained more in detail and by way of example with reference to the accompanying drawing, in which FIG. 1 is a diagrammatic representation showing an electrically controlled travel drive control system comprising two travel drive motors in a vehicle having a steerable pivoted bogie, FIG. 2 is a similar diagrammatic representation showing a system having one travel drive motor, FIG. 3 is a representation which is similar to FIG. 1 and shows a different drive arrangement and FIG. 4 is a view similar to FIG. 2 and shows a different drive arrangement.

It has been mentioned that the invention is only diagrammatically represented on the drawings. It is intended to cover all associations which are permitted thereby.

Because different multiwheel drives can be used in vehicles, the function of the travel drive control system is indicated in such a manner in the diagrammatic drawings that the essence of the invention is apparent although the shaft for mechanically driving the wheels and the means which control the preselected setting are not shown.

Various subassemblies are represented in the drawings by symbols which define the design and functions of such subassemblies in accordance with the 1971 and 1977 editions of DIN 30 600 corresponding to Publication IEC-3C (CO) 13-04 of the International Electrotechnical Commission.

The adjoining transverse lines between the boxes indicate functional connections between several subassemblies. This is also true for the functional connections to the input side of the switching matrix 14, which for that purpose is provided with a bus.

FIG. 1 shows a vehicle which is generally designated 1 and comprises a pivoted bogie 4, which is provided with road wheels 2 and 3 and with a proximity sensor 5. Alternatively, the pivoted bogie 4 may be provided with a single wheel.

A steering gear subassembly 20 is conventionally associated with the pivoted bogie 4. That steering gear subassembly 20 is operable by a steering handle 21 to steer the vehicle by imparting an angular movement to the wheels 2, 3 as indicated by the double-headed arrow 22.

In the embodiment shown in FIG. 1 which relates to a three-wheeled vehicle or a restricted four-wheeled vehicle, speed sensors 8 and 9 are associated with non-steerable wheels 6, 7, respectively, and are connected to a comparator 10, which comprises a memory. That comparator is connected by a device 12, which has an additional input 11 and serves to modify the preselected setting, and an on-off switch 13 to a switching matrix 14, which controls the connections between a source of power 15 and travel drive motors 16 and 17. A gate 18 is connected on one side to the proximity sensor 5 and the switching matrix 14 and on the other side to the comparator 10.

The embodiment diagrammatically shown in FIG. 1 comprises two travel drive motors 16, 17, which in accordance with the above explanations are connected by means of suitable countershafts 23, 24 preferably to the non-steerable road wheels 6 and 7 with which the speed sensors 8 and 9 are also associated.

The travel drive motors 16 and 17 are connected by respective power-transmitting elements 25 and 26 and speed-changing transmissions 27, 28 to the countershafts 23, 24.

Alternatively, the travel drive motors 16, 17 may be associated in accordance with FIG. 3 to the wheels 2 and 3 of the pivoted bogie 4 so that the wheels 2 and 3 are driven wheels and the non-steerable wheels 6, 7 are only provided with the speed sensors 8 and 9.

In that embodiment the wheels 2 and 3 are provided with respective stub axles 29 and 30, which are mounted in the pivoted bogie 4 and are mutually independently rotatable. The stub axles are provided with respective transmissions 31, 32, which are connected by diagrammatically indicated power-transmitting elements 33, 34 to the drive motors 16, 17. It will be understood that the driving power can alternatively be transmitted by a central bearing and transmission subassembly 35, which is carried by the pivoted bogie so that it can easily accommodate the angular excursion imparted to the pivoted bogie to steer the vehicle.

These are preferred embodiments.

It is pointed out that the speed sensors 8, 9 as well as one or more travel drive motors may be associated with the wheels 2 and 3, as before and that one or more additional travel drive motors are provided which are associated with the wheels 6 and 7. This alternative association is not explicitly mentioned but covered by the diagrammatic representation.

In this respect, a combination of the embodiments shown in FIGS. 1, 2 and 4 is also included.

In a simple embodiment of the control system the signals generated by the speed sensors 8 and 9 are applied to the comparator 10 in synchronism when the vehicle is driving straight ahead and out of synchronism when the vehicle is cornering. The preselected setting of the switching matrix 14 for the control of the travel motors 16 and 17 is modified by the comparator 10 to match the steering geometry; the comparator 10 may also cause a response of the on-off switch 13. The drive means may be so designed that the memory in the comparator 10 may be omitted because one travel drive motor is started before the other for a renewed generation of a signal. When a vehicle provided with such an arrangement is in an adverse maneuvering position and both travel drive motors have been stopped, one travel drive motor may be started first and the vehicle can then be caused to travel straight ahead in response to the signals which are received.

If a device 12 is provided for receiving at 11 an additional input signal for modifying the preselected setting, the maximum speed of the vehicle in dependence on the radius of curvature can be infinitely controlled by the signal difference.

But the comparator 10 is preferably provided with a memory, which may be used mainly for programming a limit value but may also hold the last-received values in readiness for a resumption of travel.

In FIG. 3 the memory is shown as a separate element 36.

It is emphasized that the contacting lines 37, 38, 39, 40 between subassemblies 10, 11, 12, 13, 14 represent functional connections, which has been specifically indicated in FIG. 3 by three parallel lines. This remark applies to all figures. In accordance therewith, the bus 41 is diagrammatically indicated in FIG. 3.

When the steering gear has been adjusted during a standstill of the vehicle and the same is to be restarted, it may be necessary to suppress or override the output of the memory of the comparator 10 when the steering gear has been adjusted to a position in an intermediate angular range or it may be necessary to use the output of the memory and possibly an indication of the sense of the angular movement when the steering gear has been moved through said intermediate angular range before the vehicle is restarted. When the steering gear is adjusted to a position in the intermediate angular range during a standstill of the vehicle, the proximity sensor detects the sense of the excursion of the steering gear and possibly also the angle of said excursion. When the gate 18 subsequently detects a supply of travel drive current from the switching matrix 14, the output of the proximity sensor 5 is transmitted by the gate 18 to suppress certain outputs of the memory. Alternatively, certain stored values may be erased if the memory is reprogrammed as the vehicle is restarted.

In all travel situations and during positions of the steering gear throughout the steering range, the above-mentioned control of the maximum speed may be overriden by additional input signals applied at 11 to the device 12. For instance, in fork lift trucks it is possible to apply correcting values depending on the lifting height and the load moment. Besides, the electromotive braking may be adapted to varying conditions of the vehicle.

The vehicle generally designated 1a in FIG. 2 comprises those of the elements of FIG. 1 which are required for the control of a single travel drive motor 19. The latter is connected by a differential 42 to the wheels 7 and 9.

The differential 42 is connected to the wheels 6, 7 by the shafts 43, 44.

FIG. 4 shows a pivoted bogie 4 and adjacent thereto a differential 45, which is connected by transmitting means 46 to a travel drive motor 19. Shafts 47, 48 extend from the differential 45 to the steerable wheels 2, 3. In this case, speed sensors 8', 9' are connected by functional connections 49, 50 to the comparator 10. If the pivoted bogie 4 comprises only a single road wheel, the travel drive motor 19 may be coupled to that single road wheel.

The mode of operation of the control system is the same as described hereinbefore but, as is apparent, is simplified in that means for modifying the control of the travel drive motor 19 by the switching matrix are associated with the non-steerable wheels 6 and 7 and comprise mainly the speed sensors 8 and 9 and a further modifying signal may be superposed via the input 11. From the above description of the function it is clearly apparent that the device 12 is directly connected in this case to the switching matrix 14, although this arrangement is not shown in the drawing.

In the arrangement shown in FIG. 2, the device 12 is also directly connected to the switching matrix 14, which is connected to the power source 15 and the travel drive motor 19.

It is also pointed out that various components are operatively connected by functional connections 52, 53, 54, 55, 56, 57, 58 and 59 are provided between various subassemblies in the embodiment shown in FIG. 1. Corresponding functional connections 60, 61, 62, 58 and 59 are indicated in FIG. 2.

What is claimed is:

1. In an electrically controlled travel drive control system for a steerable vehicle comprising a steerable axle assembly having swivelled first road wheel means, a second axle assembly spaced from said steerable axle assembly in the longitudinal direction of the vehicle and having second road wheel means, one of said road wheel means comprising two road wheels disposed on opposite sides of said vehicle, and travel drive motor means operatively connected to at least one of said road wheel means, the improvement residing in that two speed sensors are associated with said two road wheels and operable to generate speed signals which are representative of the speeds of the respective road wheels, a comparator is arranged to receive said speed signals and to generate an output which depends on the difference between said speed signals, additional input means are provided and adapted to receive an additional input signal, a switching system is provided, which is adapted to generate a travel drive control signal for controlling said travel drive motor means in dependence on the difference between said speed signals and on said additional input signal, said steerable axle assembly comprises an angularly movable bogie and two road wheels mounted in said bogie and disposed on opposite sides of said vehicle, said travel drive motor means comprise two travel drive motors, one of said road wheel means comprises two road wheels disposed on opposite sides of said vehicle and operatively connected to respective ones of said travel drive motors, a proximity sensor is associated with said steerable axle assembly and adapted to deliver an output signal which depends on the angular position of said bogie, and said switching system is adapted to control said travel drive motors in dependence on the output signal of said proximity sensor.

2. A travel drive control system as set forth in claim 1, which is incorporated in a fork lift truck.

3. A travel drive control system as set forth in claim 1, in which said switching system consists of a switching matrix.

4. A travel drive control system as set forth in claim 1, in which said switching system comprises a travel drive control pulse generator for generating said travel drive control signal.

5. A travel drive control system as set forth in claim 1, in which said second road wheel means comprise two road wheels disposed on opposite sides of said vehicle and said speed sensors are associated with said two road wheels of said second road wheel means.

6. A travel drive control system as set forth in claim 1, in which said travel drive motor means are operatively connected to said two road wheels disposed on opposite sides of said vehicle.

7. A travel drive control system as set forth in claim 1, in which said speed sensors are indirectly coupled to the road wheels with which they are associated.

8. A travel drive control system as set forth in claim 1, in which a memory is connected to said comparator and adapted to store difference data representing the difference between said speed signals, said switching system is adapted to control said travel drive motors in dependence on said difference data when said vehicle is started, said proximity sensor is arranged to generate said output signal when said bogie is in a position in a defined intermediate portion of its range of angular movement, a gate has a first input adapted to sense the energization of said travel drive motor means, a second input adapted to receive the output signal of said proximity sensor and an output adapted to deliver said output signal of said proximity sensor to said comparator and to said memory when said travel motor means are energized at the same time, said memory is arranged to erase said difference data in response to the reception of said output signal of said proximity sensor by said memory, and said switching system is adapted to control said travel drive motor means in dependence on the output signal of said proximity sensor delivered to said comparator.

9. A travel drive control system as set forth in claim 8, in which said proximity sensor is adapted to generate an output signal which indicates the sense of an angular movement of said bogie and said switching system is adapted to control said travel drive motor means in dependence on the thus indicated sense.

10. A travel drive control system as set forth in claim 8, in which said proximity sensor is adapted to generate an output signal which indicates the extent of the angular movement of said bogie and said switching system is adapted to control said travel drive motor means in dependence on the thus indicated extent of said angular movement.

11. A travel drive control system as set forth in claim 8, in which said proximity sensor is adapted to generate an output signal which indicates the sense and extent of an angular movement of said bogie and said switching system is adapted to control said travel drive motor means in dependence on the thus indicated sense and extent of said angular movement.

12. A travel drive control system as set forth in claim 1, in which said additional input means are responsive to an additional input signal which indicates the load moment on the vehicle.

13. A travel device control system as set forth in claim 1, in which said additional input means are responsive to an additional input signal which indicates a lifting height of a load carried by the vehicle.

14. In an electrically controlled travel drive control system for a steerable vehicle comprising a steerable axle assembly having swivelled first road wheel means, a second axle assembly spaced from said steerable axle assembly in the longitudinal direction of the vehicle and having second road wheel means, one of said road wheel means comprising two road wheels disposed on opposite sides of said vehicle, and travel drive motor means operatively connected to at least one of said road wheel means, the improvement residing in that two speed sensors are associated with said two road wheels and operable to generate speed signals which are representative of the speeds of the respective road wheels, a comparator is arranged to receive said speed signals and to generate an output which depends on the difference between said speed signals, additional input means are provided and adapted to receive an additional input signal, a switching system is provided, which is adapted to generate a travel drive control signal for controlling said travel drive motor means in dependence on the difference between said speed signals and on said additional input signal, a memory for storing data which are specific to the vehicle is associated with the comparator, switching means are provided which are operable in response to the output of said comparator in dependence on data stored in said memory, said switching system is adapted to control said travel drive motor means in dependence on the state of said switching means, said switching system is adapted to limit the speed of said travel drive motor means to a preselected maximum, reduced maximum speed data defining a lower speed below said preselected maximum are stored in said memory, said switch means are operable to supply said reduced maximum speed data from said memory to said switching system when said output of said computer amounts at least to a preselected value, and said switching system is arranged to limit the speed to said travel drive motor means to said lower speed when said reduced maximum speed data have been supplied from said memory to said switching system.

15. In an electrically controlled travel drive control system for a steerable vehicle comprising a steerable axle assembly having swivelled first road wheel means, a second axle assembly spaced from said steerable axle assembly in the longitudinal direction of the vehicle and having second road wheel means, one of said road wheel means comprising two road wheels disposed on opposite sides of said vehicle, and travel drive motor means operatively connected to at least one of said road wheel means, the improvement residing in that two speed sensors are associated with said two road wheels and operable to generate speed signals which are representative of the speeds of the respective road wheels, a comparator is arranged to receive said speed signals and to generate an output which depends on the difference between said speed signals, additional input means are provided and adapted to receive an additional input signal, a switching system is provided, which is adapted to generate a travel drive control signal for controlling said travel drive motor means in dependence on the difference between said speed signals and on said additional input signal, a memory for storing data which are specific to the vehicle is associated with the comparator, said travel drive motor means comprise two travel drive motors, one of said road wheel means comprise two road wheels operatively connected to respective ones of said travel drive motors, data representing a predetermined value for the difference between said speed signals are stored in said memory and an on-off switch is adapted to control the energization of said travel drive motors independently of each other in dependence on whether the difference between said speed signals exceeds or is lower than said predetermined value.

16. In an electrically controlled travel drive control system for a steerable vehicle comprising a steerable axle assembly having swivelled first road wheel means, a second axle assembly spaced from said steerable axle assembly in the longitudinal direction of the vehicle and having second road wheel means, one of said road wheel means comprising two road wheels disposed on opposite sides of said vehicle, and travel drive motor means operatively connected to at least one of said road wheel means, the improvement residing in that two speed sensors are associated with said two road wheels and operable to generate speed signals which are representative of the speeds of the respective road wheels, a comparator is arranged to receive said speed signals and to generate an output which depends on the difference between said speed signals, additional input means are provided and adapted to receive an additional input signal, a switching system is provided, which is adapted to generate a travel drive control signal for controlling said travel drive motor means in dependence on the difference between said speed signals and on said additional input signal, said travel drive motor means comprise two travel drive motors and one of said road wheel means comprise two road wheels operatively connected to respective ones of said travel drive motors.

17. A travel drive control system as set forth in claim 16, in which said speed sensors are associated with said road wheels operatively connected to said travel drive motors.

18. A travel drive control system as set forth in claim 16, which comprises an on-off switch for controlling the energization of said travel drive motors independently of each other in dependence on the output of said comparator.

* * * * *